United States Patent [19]

Le Deit

[11] Patent Number: 4,595,082

[45] Date of Patent: Jun. 17, 1986

[54] DRUM BRAKE

[75] Inventor: Gerard Le Deit, Aulnay Sous Bois, France

[73] Assignee: Societe Anonyme D.B.A., Paris, France

[21] Appl. No.: 289,959

[22] PCT Filed: Aug. 29, 1978

[86] PCT No.: PCT/FR78/00018

§ 371 Date: Mar. 23, 1979

§ 102(e) Date: Mar. 23, 1979

[30] Foreign Application Priority Data

Aug. 29, 1977 [FR] France ............................... 77 26185

[51] Int. Cl.$^4$ .............................................. F16D 65/54
[52] U.S. Cl. .............................. 188/79.5 P; 188/196 B
[58] Field of Search ................... 188/79.5 R, 79.5 GC, 188/79.5 GE, 79.5 P, 79.5 GT, 79.5 SS, 196 C, 196 S

[56] References Cited

U.S. PATENT DOCUMENTS 2,378,662 6/1945 Shuman ....................... 188/79.5 GT
3,991,861 11/1976 Hayashida ..................... 188/79.5 P
4,121,701 10/1978 Gestkoff ...................... 188/79.5 GE

FOREIGN PATENT DOCUMENTS 1151191 7/1963 Fed. Rep. of Germany ... 188/79.5 P
2,404,975 8/1974 Fed. Rep. of Germany ... 188/79.5 P
1405756 9/1975 United Kingdom ....... 188/79.5 GE Primary Examiner—George E. A. Halvosa
Attorney, Agent, or Firm—Larry J. Palguta; Ken C. Decker

[57] ABSTRACT

The invention relates to a drum brake for an automotive vehicle, comprising two brake shoes (18, 20) adapted to be moved apart by a wheel cylinder (14), one (18) of said shoes carrying an adjuster including a lever (40) having a free end (48) defining a toothed sector (52) cooperating with a pawl (44) also carried by said one shoe (18), a strut (50) being provided between the other shoe (20) and the lever (40) to automatically control pivoting of the latter.

A link (74) disposed between the pawl (44) and the lever (40) to prevent pivoting of the latter through more than a predetermined angle relative to the position occupied by the lever (40) when the lining carried by the shoes (18, 20) are new.

11 Claims, 3 Drawing Figures

DRUM BRAKE

The invention relates to a drum brake of the type comprising two brake shoes, operating means situated between two first adjoining ends of the shoes, and adjusting means designed to increase automatically the distance separating the first ends of the shoes as a function of the wear on linings carried by the shoes, the adjusting means comprising a lever pivoted at one end on a first one of the shoes in the vicinity of the operating means, a pawl pivoted on the first shoe and meshing with a toothed sector formed on the other end of the lever under the influence of resilient means, and an operating member responsive to the distance between the said first ends of the shoes so as to pivot the lever in a direction corresponding to adjustment of the brake.

In such drum brakes, when the linings of the shoes are worn, pivoting of the adjusting lever controlled by the spacing of the shoes can cause the pawl to escape circumferentially from the teeth of the toothed sector formed on the lever. Also, even if the deflection of the adjusting lever is not enough to make the pawl escape, it may bring the free end of the lever into engagement with the hub of the vehicle wheel on which the brake is mounted. In either of these situations, the components of the adjusting means and other parts of the brake and hub may be seriously damaged.

To overcome these disadvantages, the invention proposes a drum brake of the type described above, characterized in that abutment means are provided to prevent pivoting of the lever through more than a predetermined angle relative to the position occupied by the lever when idle and when the linings carried by the shoes are new, second resilient means being associated with the operating member to absorb the force transmitted by the latter when the lever is abutting on the abutment means.

With such a feature, of course, the lever cannot pivot when it comes into contact with the abutment means, the position of which is so selected as to prevent the pawl escaping from the teeth in the toothed sector on the adjusting lever and also to prevent the latter from making contact with the wheel hub.

According to another feature of the invention, the abutment means comprise at least one rigid member associated with the first shoe. Preferably, such a member is pivoted at one end on a pivot pin bearing the pawl, the other end of the said member comprising an abutment portion capable of engaging a corresponding abutment surface defined on the lever.

According to still another feature of the invention, the said member cooperates with those faces of the pawl and lever remote from the first shoe irrespective of the position occupied by the lever, so preventing any axial offset between the pawl and the toothed sector formed on the lever. Such a feature also makes it possible to prevent the teeth in the toothed sector on the lever from escaping in a direction parallel to the drum axis from the teeth on the pawl. A member so designed can therefore prevent both circumferential escape when the components have reached the limit of their travel and axial escape of any time of the teeth in the toothed sector from the pawl, while ensuring that the adjusting lever does not touch the wheel hub. A drum brake having these features is therefore even more reliable than known drum brakes of the type defined above.

A particular embodiment of the invention will now be described by way of example with reference to the accompanying drawings, in which.

Figure 1:
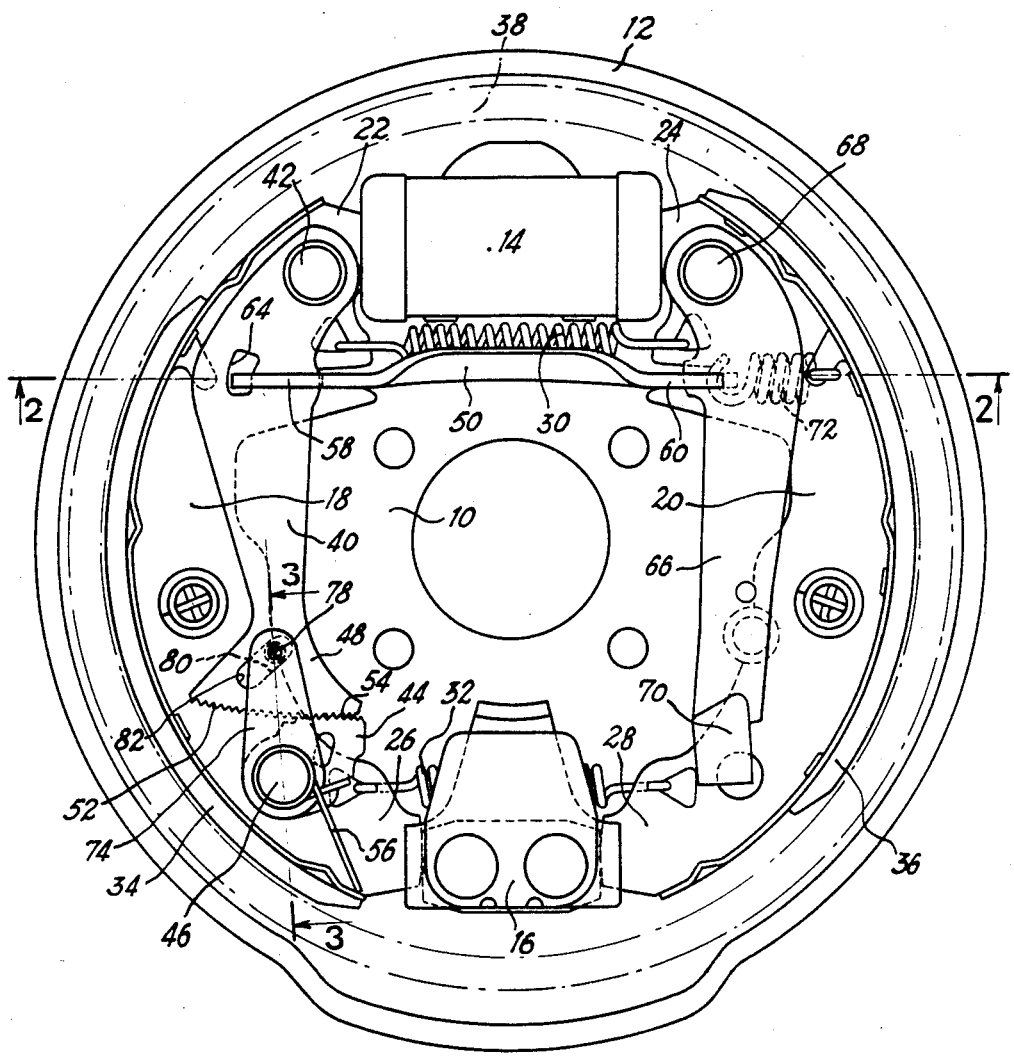
FIG. 1 is a general view of a drum brake embodying the principles of the invention.

The drum brake illustrated in FIG. 1 comprises a support plate 10 designed to be attached to a non-rotary part (not shown) near one wheel of a vehicle and defining a substantially circular rim 12 on its outer periphery. Operating means, for example a wheel cylinder 14, and a fixed fulcrum block 16 are mounted at two diametrically opposite places on the support plate 10. The wheel cylinder 14 can be connected to a pressure fluid source, for example the master cylinder of the vehicle (not shown). Two arcuate brake shoes 18, 20 are slidably received on the support plate 10 and arranged so that the wheel cylinder 14 engages two adjacent ends 22, 24 of the shoes 18, 20 respectively, and so that the two opposite ends 26, 28 of the shoes rests on the fulcrum block 16. Also, two helical springs 30, 32 respectively urge the shoe ends 22, 24 on to the wheel cylinder 14 and the shoe ends 26, 28 on the fulcrum block 16. Each shoe 18, 20 comprises a web substantially parallel to the plane defined by the support plate 10 and an arcuate rim on which a respective friction lining 34, 36 is mounted. The friction linings 34, 36 are mounted on the rims of the shoes 18, 20 by any known means, for example adhesive or rivets. A drum 38, shown by chain lines in FIG. 1, is associated with a part (not shown) rotating with the wheel of the vehicle. The drum 38 is situated between the circular rim 12 of the support plate 10 and the friction linings 34, 36 of the shoes 18, 20. Therefore, operation of the wheel cylinder 14 moves the shoe ends 22, 24 apart to urge the friction linings 34, 36 into engagement with the rotary drum 38, so operating the brake.

Figure 2:
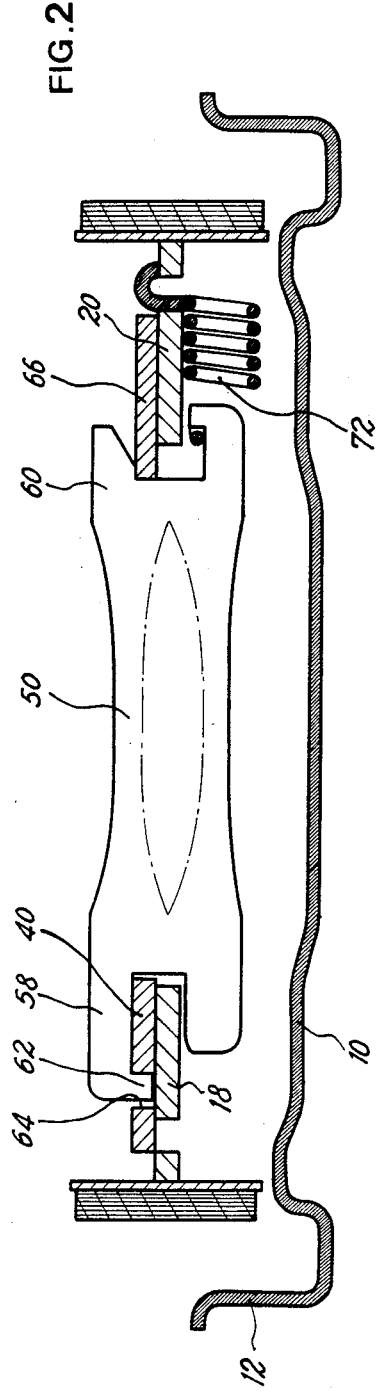
FIG. 2 represents a section along a line 2—2 in FIG. 1.

The drum brake illustrated in FIG. 1 also comprises adjusting means for automatically increasing the distance separating the shoe ends 22, 24 as a function of the wear on the linings 34, 36 of the shoes. These adjusting means comprise an adjusting lever 40 pivoted, for example by means of a pivot-forming rivet 42, on the end 22 of the shoe 18, a pawl 44 pivoted, for example by means of a pivot-forming rivet 46, on the shoe 18 near the free end 48 of the lever 40, and an operating member 50 responsive to the distance separating the shoe ends 22, 24 so as to effect pivoting of the lever 40 on the rivet 42. The adjusting lever 40 has on its free end 48 a toothed sector 52. A toothed sector 54 on the pawl 44 is urged into engagement with the sector 52 by a hairpin spring 56. This spring 56 is mounted on the rivet 46 and cooperates by one of its ends with the rim of the shoe 18 and by its other end with the pawl 44, so that it urges the toothed sector 54 into engagement with the toothed sector 52. As best shown in FIG. 2, the operating member 50 comprises a link having forked ends 58, 60 which receive the webs of the shoes 18,20 respectively. The end 58 of the link 50 also receives the adjusting lever 40, with which it cooperates by means of a lug 62 which enters a recess 64 in the lever 40. The resulting cooperation between the link 50 and adjusting lever 40 preferably defines a predetermined operating clearance, below which the link 50 can move freely relative to the lever, and above which any motion of the link 50 to the right viewing FIGS. 1 and 2 causes the lever 40 to pivot anticlockwise viewing FIG. 1. Preferably, the end 58 of the link 50 cooperates with the lever 40 near the rivet 42, and the free end 48 of the lever 40 extends near the end 26 of the shoe 18, so that any motion of the end 58 of the link 50 causing pivoting of the lever 40 is amplified substantially at the free end of the latter, so increasing the accuracy of the adjustment. In the embodiment illustrated, the forked end 60 of the link 50 receives, in addition to the web of the shoe 20, a handbrake operating lever 66 which is pivoted, for example by means of a pivot-forming rivet 68, on the end 24 of the shoe 20, and of which the free end 70 is designed to receive an operating cable (not shown) adapted to be connected to a manual operating lever situated in the driver's compartment of the vehicle. Also, a helical spring 72 is inserted between the end 60 of the link 50 and the web of the shoe 20, so that the link 50 normally moves with the shoe 20 but can move relative to the shoe 20 under certain conditions (described below).

Figure 3:
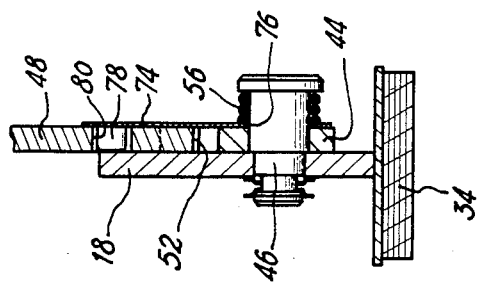
FIG. 3 represents a section along a line 3—3 in FIG. 1.

In accordance with the invention, abutment means are provided to prevent pivoting of the lever 40 through more than a predetermined angle relative to the position which it occupies when idle while the linings 34, 36 are new. These abutment means comprise a rigid member 74 associated with the shoe 18 by means of the rivet 46 bearing the pawl 44. As best shown in FIGS. 1 and 3, the member 74 comprises a sheet of rigid material, for example sheet metal, defining a plane substantially perpendicular to the drum axis. The member 74 is in the form of a link of which one end contains a circular hole 76 receiving the rivet 46 by which the member 74 is pivoted on the shoe 18. The other end of the member 74 bears a stud 78 which extends parallel to the drum axis in an oblong hole 80 formed in the end 48 of the lever 40. The stud 48 is substantially cylindrical, and its length is slightly smaller than the thickness of the lever 40, so that it does not engage the web of the shoe 18. The oblong hole 80 is substantially straight and defines an axis inclined at approximately 45° to a tangent to a circle defined by movement of any point on the axis during pivoting of the lever 40. The stud 76 thus defines an abutment portion of the member 74 capable of engaging the left-hand end 82 of the hole 80 viewing FIG. 1 when pivoting of the lever 40 effected by the link 50 due to wear on the friction linings 34, 36 has covered an angle such that the stud 78 can engage the end of the oblong hole 80.

The drum brake just described with reference to FIGS. 1 to 3 operates as follows:

On operation of the wheel cylinder 14, the ends 22, 24 of the shoes 18, 20 are moved apart so that the friction linings 34, 36 are brought into frictional engagement with the rotary drum 38, leading to operation of the brake. During this operation, the shoe ends 26, 28 remain in contact with the fulcrum block 16 under the influence of the return spring 32. When the shoe ends 22, 24 move apart, the link 50 moves with the end 24 of the shoe 20 under the influence of the spring 72, so that the lug 62 on the end 58 of the link moves relative to the recess 64 in the adjusting lever 40. When the movement is less than or equal to the operating clearance existing between the link 50 and lever 40, it does not produce any relative motion between the latter and the shoe 18. When, however, the movement of the lug on the link 50 relative to the recess 64 is greater than this predetermined clearance, the lug 62 engages the right-hand edge of the recess 64 viewing FIGS. 1 and 2 and so pivots the lever anti-clockwise on the rivet 42. The end 48 of the lever 40 therefore moves relative to the pawl 44, tending to pivot the latter clockwise on the rivet 46, counteracting the spring 56. When the end 48 of the lever 40 moves enough for the toothed sector 54 on the pawl 44 to jump over a tooth in the toothed sector 52 on the lever 40, this operation takes place naturally under the influence of the spring 56. Consequently the end 48 of the lever 40 moves to the right viewing FIGS. 1 and 2 relative to the shoe 18 by an amount corresponding to the distance separating two teeth in the toothed sector 52. When operation of the wheel cylinder 14 ceases, the return spring 30 urges the shoe ends 22, 24 towards their idle positions, which may or may not differ from the idle positions previously occupied by them before operation of the wheel cylinder, depending on whether or not the pawl 44 has jumped over a tooth in the toothed sector 52.

A cycle of this kind is repeated whenever the wheel cylinder 14 operates, so that as the wear on the linings 34, 36 increases the free end 48 of the lever 40 moves to the right viewing FIG. 1, so modifying the distance separating the shoe ends 22, 24 in the idle position.

Just as the end 48 of the lever 40 moves progressively relative to the pawl 44, so the stud 78 cooperating with the edge of the oblong hole 80 is urged to the right viewing FIG. 1, so that the member 74 turns clockwise on the rivet 46. When the stud 78 engages the left-hand end 82 of the hole 80, it becomes impossible for the lever 40 to continue pivoting anticlockwise on the rivet 42. Such a situation, determined by the dimensions and relative arrangements of the member 74, lever 40 and oblong hole 80, must arise when the linings 34, 36 are almost completely worn down and before the toothed sector 52 on the lever 40 has pivoted so far relative to the pawl 44 as to escape circumferentially from the latter or engage the wheel hub (not shown). When the wheel cylinder 14 is operated after the stud 78 has engaged the end 82 of the oblong hole 80, the force transmitted by the link 50 to the lever 40 in order to pivot the latter on the rivet 42 is absorbed by the spring 72, so that none of the components of the brake is damaged. Thus the only secondary consequence of locking of the adjusting lever 40 is that after some time the stroke required for hydraulic operation of the brake becomes longer. This phenomenon, which occurs when the linings 34, 36 are worn, can give the driver of the vehicle a good indication of the condition of the linings.

In addition, the member 60 is so arranged relative to the pawl 44 and lever 40 that it cooperates with those faces of the pawl and lever remote from the shoe 18, irrespective of the position occupied by the lever 40 relative to the shoe 18. It is therefore impossible for the end 48 of the lever 40 to be offset parallel to the drum axis relative to the pawl 44. The member 74 therefore fulfils two roles: it locks the adjusting lever 40 at the end of its travel, to prevent the latter from escaping circumferentially relative to the pawl 44 and it prevents the toothed sector 52 from escaping axially relative to the toothed sector 54.

In the event of mechanical operation of the brake owing to the handbrake lever 66 being turned clockwise on the rivet 68, the lever 66 urges the end 22 of the shoe 18 away from the end 24 of the shoe 20 by way of the link 50. The friction linings 34, 36 therefore engage the drum 38, causing mechanical operation of the brake. During this operation, and in contrast to brake operation by means of the wheel cylinder, the link 50 moves with the shoe 18, so that the adjusting means comprising the lever 40 and pawl 44 are not operated. The link 50 does, however, move relative to the shoe 20, despite the force exerted by the spring 72. When operation of the handbrake lever 66 ceases, the various components of the brake are urged back into their idle positions by the return springs 30, 72.

It will be appreciated that the invention is not restricted to the embodiment just described by way of example. In particular, the invention also applies to brakes without a handbrake lever and to brakes in which the wheel cylinder 14 is replaced by any other operating means, for example, cam- or wedge-type operating means operated mechanically or pneumatically. Also, the abutment member 74 may be modified in respect of its shape and may, for example, be placed directly between the support plate and the lever, without exceeding the scope of the invention.

What is claimed is:

1. A drum brake comprising two brake shoes, operating means situated between two first adjoining ends of the shoes, and adjusting means designed to increase automatically the distance separating the first ends of the shoes as a function of the wear on linings carried by the shoes, the adjusting means comprising a lever pivoted at one end on a first one of the shoes in the vicinity of the operating means, a pawl pivoted on the first shoe and meshing with a toothed sector formed on the other end of the lever under the influence of resilient means, and an operating member responsive to the distance between the said first ends of the shoes so as to pivot the lever in a direction corresponding to adjustment of the brake, wherein abutment means are provided to prevent pivoting of the lever through more than a predetermined angle relative to the position occupied by the lever when idle and when the linings carried by the shoes are new, second resilient means being associated with the operating member to absorb the force transmitted by the latter when the lever is abutting on the abutment means, and the abutment means comprise at least one rigid member extending between the lever and the first shoe to form an operative connection therebetween.

2. A drum brake as claimed in claim 1, wherein the member is pivoted at one of its ends on a pivot pin bearing the pawl, the other end of said member comprising an abutment portion capable of engaging a corresponding abutment surface defined on the lever.

3. A drum brake as claimed in claim 2, wherein the abutment portion comprises a stud which enters an oblong hole in the lever, one end of the oblong hole defining the said abutment surface.

4. A drum brake as claimed in claim 3, wherein the oblong hole is substantially straight and defines an axis inclined relative to a tangent to a circle defined by the movement of a point on the axis during pivoting of the lever.

5. A drum brake as claimed in claim 4, wherein the axis of the oblong hole is at approximately 45° to the tangent.

6. A drum brake as claimed in claim 2, wherein the said member cooperates with two faces of the pawl and lever remote from the first shoe irrespective of the position occupied by the lever, so preventing any axial offset between the pawl and the toothed sector.

7. A drum brake as claimed in claim 6, wherein the said member comprises a sheet of rigid material defining a plane substantially perpendicular to the axis of the drum, the sheet being in the form of a link of which one end is pivoted on the pivot pin bearing the pawl and the other end comprises the abutment portion.

8. In a drum brake assembly having a backing plate which supports a pair of brake shoes, a hydraulic actuator adapted to urge the pair of brake shoes into a braking position and an adjustment mechanism comprising an adjusting lever pivoted on one of said shoes, a pawl pivoted on said one shoe and meshing with a toothed sector formed on said lever, and a strut interconnecting said lever and the other of said shoe to pivot the lever on said one shoe when a brake adjustment is required, the improvement in which a link interconnects the adjusting lever and the pawl to limit pivoting of said lever relative to said one shoe to a predetermined angle.

9. The drum brake assembly of claim 8, in which said one shoe includes a web which carries the adjusting lever and the pawl, each of the latter defining opposite parallel surfaces which engage said web and the link respectively, whereby the toothed sector on said lever and said pawl are axially maintained in meshing relationship by said link.

10. The drum brake assembly of claim 9, in which said link is pivotally mounted on the pawl and carries a stud which extends axially inside an oblong opening provided in said lever to authorize a predetermined relative movement between the adjusting lever and the pawl.

11. The drum brake assembly of claim 10, in which a sole pivot pin mounts the pawl on the one shoe and the link on the pawl.

* * * * *